United States Patent [19]

Severin

[11] 4,016,079

[45] Apr. 5, 1977

[54] AUTOMATIC CHLORINE AND PH CONTROL APPARATUS FOR SWIMMING POOLS

[75] Inventor: Ernest O. Severin, Houston, Tex.

[73] Assignee: Aquasol, Inc., Houston, Tex.

[22] Filed: Sept. 16, 1975

[21] Appl. No.: 613,883

[52] U.S. Cl. .................... 210/96 R; 73/421 B; 137/93; 210/139; 210/142; 210/169; 356/181

[51] Int. Cl.² .................................. E04H 3/20

[58] Field of Search .................... 73/421 B; 137/93; 210/62, 96, 138, 139, 141, 142, 169, 198; 356/181

[56] References Cited

UNITED STATES PATENTS

| | | | |
|---|---|---|---|
| 1,960,615 | 5/1934 | Baker | 137/93 |
| 2,063,140 | 12/1936 | Allison | 210/96 X |
| 2,526,515 | 10/1950 | Stein | 137/93 X |
| 3,012,156 | 12/1961 | Simmons | 210/142 X |
| 3,351,542 | 11/1967 | Oldershaw et al. | 210/62 X |
| 3,401,591 | 9/1968 | Anthon | 356/181 X |
| 3,464,555 | 9/1969 | Schneider | 210/96 X |
| 3,574,553 | 4/1971 | Weitz et al. | 356/181 X |
| 3,804,253 | 4/1974 | Wellman et al. | 210/169 X |
| 3,897,798 | 8/1975 | De Vale | 137/93 X |

FOREIGN PATENTS OR APPLICATIONS

| | | | |
|---|---|---|---|
| 1,245,102 | 9/1971 | United Kingdom | 137/93 |

Primary Examiner—Thomas G. Wyse
Assistant Examiner—R. G. Mukai
Attorney, Agent, or Firm—Arnold, White & Durkee

[57] ABSTRACT

Control apparatus for swimming pools to automatically regulate chlorinator and acidifier operation, thereby maintaining a desired chlorine residual and pH level. A first liquid sample from a swimming pool along with a chlorine reagent substance and a second liquid sample from the pool along with a pH reagent are sequentially introduced into a sample cell with a light source projecting light through the sample cell onto first and second photoelectric cells. The first photocell produces a signal having a magnitude that is directly proportional to the chlorine residual in the first liquid sample, and the second photocell produces a signal functionally related to the pH level of the second liquid sample. First and second comparators connected to the first and second photoelectric cells detect whether the chlorine residual or the pH level of the pool water is above or below a prescribed value and supply a two-state output signal which represents the existence or nonexistence of the prescribed level of chlorine residual or pH in the liquid samples. Flip-flops store the detection results and supply signals to driver circuits which initiate or inhibit chlorinator and acidifier operation. A timing circuit periodically enables system operation with a state controller sequencing system operation.

12 Claims, 5 Drawing Figures

AUTOMATIC CHLORINE AND PH CONTROL APPARATUS FOR SWIMMING POOLS

BACKGROUND OF THE INVENTION

This invention relates to the treatment of water by the controlled introduction of antibacterial substances and by the control of parameters which affect the effectiveness of the substances. More specifically, this invention relates to an apparatus for controlling the chlorine residual and the pH of water in a swimming pool.

Swimming pools provide a great deal of recreational pleasure. The pleasure derived from a swimming pool is substantially dependent upon the quality of the water in the pool. To assure comfort and safety to swimmers using the pool, it is absolutely essential that the water be properly treated chemically. Chemical treatment of swimming pool water primarily involves two pool water tests—one for chlorine, the other for pH.

Since its introduction into water treatment, chlorination has become a universally accepted method for active disinfection of water and both public and private swimming pools rely on chlorine to sterilize the pool of bacteria and maintain water purity. A chlorine residual must be maintained in the pool water for effective sterilization. If too little chlorine is supplied to the water, not all bacteria will be removed from the water, and the swimming pool will not be safe for swimming. For this reason chlorine in excess of that required for complete sterilization is generally supplied, resulting in a chlorine residual in the pool water. A good average chlorine residual is 1.0 parts per million (ppm); however the pool may effectively have a residual chlorine level as low as 0.6 ppm or as high as 2.0 ppm.

The retention of chlorine residual in swimming pool water is the key to an effective bacteriacidal function. Chlorine escapes into the atmosphere from the open pool water and is consumed by its sterilizing action in an amount proportional to the level of bacteria present in the swimming pool. The quantity of chlorine required to completely sterilize the water in the swimming pool is referred to as the chlorine demand. Chlorine demand of a pool is affected by several factors. The bather load will affect chlorine demand as each swimmer entering the pool uses some of the chlorine residual. Therefore, more swimmers require more chlorine be added to the pool water. Higher water temperatures tend to exhaust chlorine more rapidly. Rain showers and high winds introduce atmospheric contaminants into the pool and dilute its chemical system, creating a greater demand for chlorine. Direct sunlight accelerates the dissipation of chlorine and foliage such as trees, shrubs, flowers and grass in the pool area contribute algae spores, leaves, pollen and associated wastes which stress the pool's chemical system.

Swimming pools may be chlorinated manually by administering a granular form of organic concentrate directly into the pool, but the most common way to introduce chlorine into the pool water is through a chlorinator. A conventional chlorinator receives a continuous flow of water which passes through a container of chlorine. In the past, it has been necessary to periodically perform a manual test on the pool water to check for proper chlorine supply. The test involves the taking of a sample of pool water by hand and adding an indicator substance which provides an indication of chlorine concentration. The pool side test for chlorine establishes the average demand rate and confirms that the necessary level of chlorine residual for effective bacteria control is being maintained. The pool side test for chlorine is usually made using a conventional test reagent, such as o-toludine. While the test should be run often at periodic intervals, all too often the test is not performed due to forgetfulness or inattentiveness.

Proper pH control is essential to the correct operation of a pool as the microbicidal activity of chlorine is pH dependent. The pH value of the swimming pool water expresses its acid-alkali ratio. A desirable pH range for pool operation is pH 7.4 to pH 7.6, slightly basic. Lower pH values tend to accelerate the loss of chlorine and cause excessive eye irritation, corrosion of metal components and possible etching of the pool's interior. Higher pH values slow the microbicidal function of chlorine and can produce scale formation on the pool interior, piping and heater coils.

In addition, some nitrogen, in the form of ammonia, is in the pool water at all times from sources such as human wastes. Chlorine in the pool water may combine with the nitrogen to form other chemical compounds called "chloramines". The formation of chloramines is accelerated as the pH goes to 7.0 or lower. The formation of such compounds is retarded by keeping the pH in the desired slightly basic range. Chloramines may cause eye discomfort to swimmers using the pool a great deal and extensive chemical treatment may be necessary to remove chloramines from the water, assuring its comfort for swimming.

The most frequent adjustment required is to lower the pH of pool water. Left uncorrected, the water in a swimming pool has a tendency to rise in pH due to the introduction of foreign matter. To lower the pH level, strong liquid acids such as muriatic acid have been used. Strong acids of this type are potentially dangerous and are hazardous when being handled. Acid may be added to swimming pool water in several different ways. One approach is to dump a quantity of acid in the swimming pool periodically. The addition of acid to pool water in this manner does lower pH, but the change is abrupt, causing an excessive loss of chlorine in a broad area where the acid is released. A second approach is to use an acidifier connected into a flow line of the circulation system of the pool to constantly supply acid to the pool. This method can result in the addition of too much acid to the pool, driving the pH below the desired range.

It is apparent that present water treatment methods for swimming pools are extremely haphazard and leave much to be desired from a safety and health standpoint. It is further apparent that coordinated control of both chlorine residual and pH without the continual performance of tests is highly desirable.

SUMMARY OF THE INVENTION

In accordance with one aspect of the present invention, an apparatus for automatically controlling a chlorinator supplying chlorine to water in a swimming pool is provided. The apparatus includes an analyzer which produces an electrical signal functionally related to the chlorine residual that is in a liquid sample from the swimming pool. A controller periodically introduces a liquid sample into the analyzer and initiates operation thereof, resulting in the production of the electrical signal. A comparator is coupled to the analyzer and detects the existence or non-existence of a desired level of chlorine residual in the liquid sample based upon the electrical signal produced by the analyzer. The comparator also provides an output signal indicative of the existence or non-existence of the desired level of chlorine residual. A feed control regulates the chlorinator, supplying chlorine to the swimming pool water, in response to the output signal from the comparator to adjust the introduction of chlorine into the swimming pool as needed.

In accordance with a more specific aspect of the present invention, a reagent control device is coupled to the controller and introduces a chlorine reagent substance into the analyzer along with the liquid sample from the swimming pool. Also, the analyzer includes a sample cell into which the liquid sample from the swimming pool is introduced and retained while being analyzed, a light source disposed proximate the sample cell to project light thereon from one side, and a photocell disposed on the side of the sample cell opposite the light source to receive the light passing through the sample cell in the contained liquid sample. The controller includes a timer for initiating sampling and analyzing of the liquid sample on a preselected periodic interval with a state controller coupled to the timer sequencing and coordinating the analysis of the liquid sample within the period of operation defined by the timer. A motor driven plunger is controlled by the controller and draws a liquid sample into the sample cell of the analyzer and expels the liquid sample therefrom at the conclusion of the analysis. A storage element retains the output signal from the comparator over the interval of time between periodic introduction of liquid samples into the analyzer, thereby maintaining the setting of the feed control.

In accordance with another aspect of the invention, there is provided an apparatus for regulating the introduction of a water purification substance and a pH compensation substance into a reservoir of water to maintain a desired pH level therein. An analyzer produces a first electrical signal functionally related to the amount of liquid purification substance present in a first liquid sample from the resevoir and also produces a second electrical signal functionally related to the pH of a second liquid sample from the reservoir. A controller coordinates the taking and analyzing of liquid samples at periodic intervals with reagent introduction means coupled to the controller for entering first and second reagents into the analyzer along with first and second liquid samples. Finally, means responsive to each of the first and second electrical signals from the analyzer enables the introduction of an additional amount of liquid purification substance into the reservoir and also enables the introduction of an additional amount of pH compensation substance.

More specifically, in this aspect of the present invention, timing means supplies timing signals to the controller to initiate the taking of the first and second liquid samples and enables the operation of the analyzer at preselected periodic intervals, and a mechanically actuated piston draws a liquid sample into the analyzer in response to signals from the controller. Operation of the mechanically actuated piston and the reagent introduction means are sequenced by a state controller, which sequencing takes place within the period of enabled operation defined by the timing means.

Even more specifically, the means for enabling the introduction of additional purification substance and pH compensating substance includes a comparator coupled to the analyzer for determining the existence of a desired residual amount of the purification substance and a desired pH level, and for producing signals indicative thereof. Also, feed control means operably connects to the comparator and is responsive to the signals produced by the comparator to regulate the introduction of additional water purification substance and pH compensating substance into the reservoir of water. A storage element couples between the comparator and the feed control means to store the signals from the comparator and continuously present them to the feed control means over the interval of time between the taking of liquid samples.

BRIEF DESCRIPTION OF THE DRAWINGS

In order to appreciate the manner in which the aboverecited advantages and features of the invention are attained and to appreciate and understand others in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

In the drawings.

DETAILED DESCRIPTION OF THE PREFERRED EMBODIMENT

Figure 1:
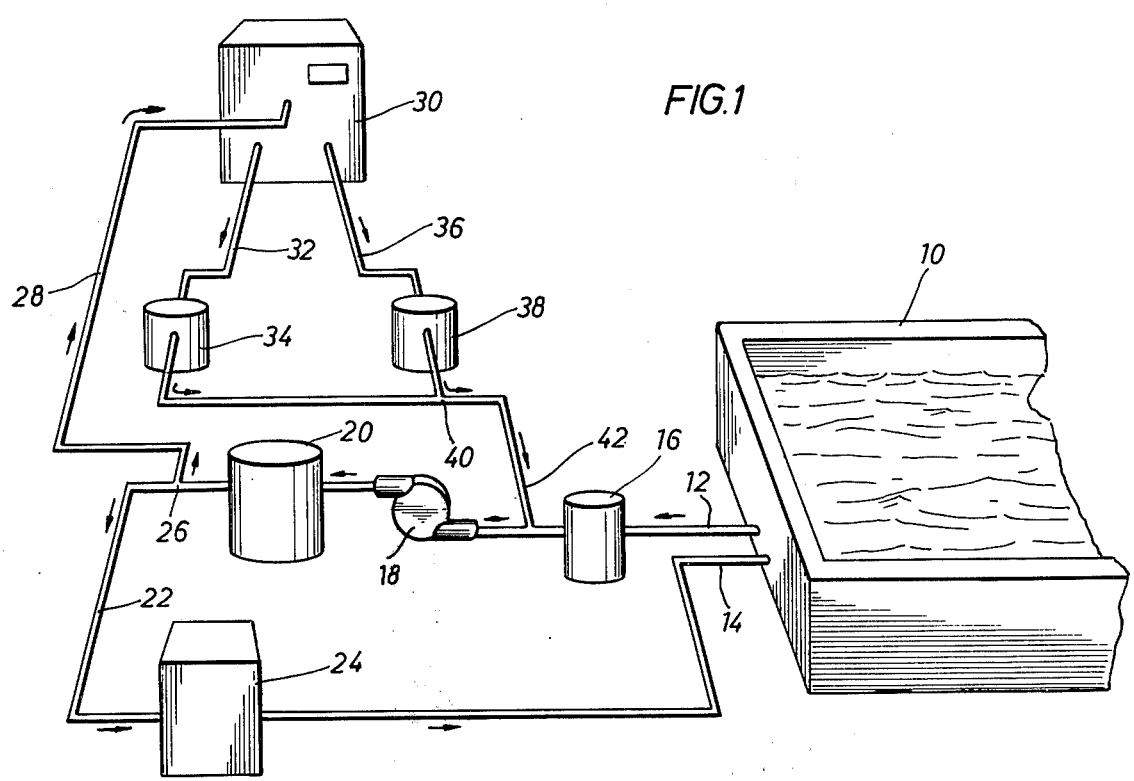
FIG. 1 is a pictorial view of swimming pool and its associated equipment to which the automatic chlorine and pH control apparatus according to the present invention is connected.

Shown in the embodiment of FIG. 1 is a reservoir of water referred to as a swimming pool 10 having conduits 12 and 14 communicating with the interior body of water held therein. Conduit 12 provides a path for discharge flow circulation from swimming pool 10 and connects to a skimmer 16. Pool water flows from skimmer 16 to a pump 18 which circulates the swimming pool water through the system. From pump 18, pool water is passed through a filter 20 and into a return conduit 22 which supplies pool water to a heater 24 for heating the pool water before it is returned to swimming pool 10 through conduit 14.

Return conduit 22 includes a T-joint 26 which permits a portion of the pool water passing through filter 20 to be siphoned off into inlet conduit 28 which leads to the automatic chlorine and pH control apparatus 30 of the present invention. A first outlet conduit 32 communicates between automatic chlorine and pH control apparatus 30 and an acidifier 34. A second outlet conduit 36 communicates between the automatic chlorine and pH control apparatus 30 and a chlorinator 38. Both acidifier 34 and chlorinator 38 operate in a conventional manner. Pool water passing through acidifier 34 and chlorinator 38 merges to form one stream of water at connecting joint 40 that is passed through conduit 42 back into the main stream of water from swimming pool 10 between skimmer 16 and pump 18.

In general, automatic chlorine and pH control apparatus 30 performs individual tests for the chlorine residual and pH level of the water contained in swimming pool 10 and, based on the results of the analyses performed, control apparatus 30 directs pool water through acidifier 34 and/or chlorinator 38. If both chlorine residual and pH level are within the desired range, control apparatus 30 prevents pool water from flowing through both acidifier 34 and chlorinator 38. Automatic chlorine and pH control apparatus 30 performs a chlorine residual and pH level analysis intermittently at timed intervals. Preferably, an analysis will be performed every eight hours. If by such analyses, control apparatus 30 determines that either additional chlorine or acid should be supplied to the pool water, the appropriate piece of equipment, acidifier 34 or chlorinator 38, will be enabled and its product will be continuously supplied to the pool water until the next test, preferably for a period of eight hours.

Figure 2:
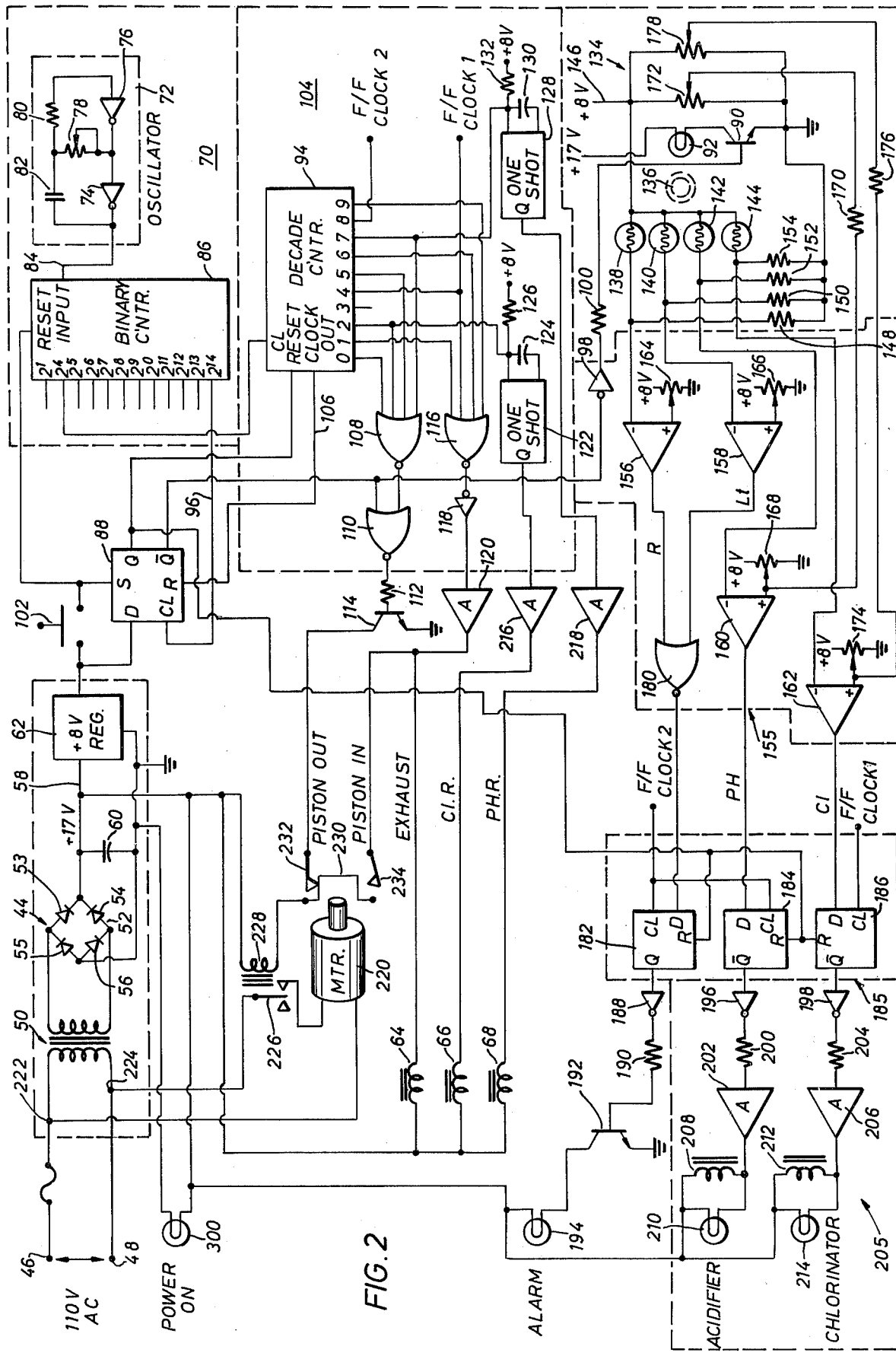
FIG. 2 is a schematic representation of the control system for the automatic chlorine and pH control apparatus shown in FIG. 1.

Referring now to FIG. 2, a schematic diagram of the control system for the automatic chlorine and pH control apparatus of the present invention is shown. The control system can be divided into the basic functional blocks of power supply, timer, controller, analyzer, comparator and feed control. Each portion of the control system will be discussed in detail in the description which follows.

With further reference to FIG. 2, the power supply 44 of the control system will now be discussed wherein input power for the control apparatus 30 is introduced at input terminals 46 and 48 having connected thereto a stepdown transformer 50. The output voltage of transformer 50 is rectified by a diodes bridge 52 having diodes 53, 54, 55 and 56, which supply current to the +17 volt busline 58. A filter capacitor 60 is connected between the +17 volt busline 58 and ground potential.

Connected to busline 58 is a +8 volt regulator 62 which supplies part of the required system voltage needed for the various electronic components. Regulator 62 supplies 8 volt power to the control system, and busline 58 supplies +17 volt power to the system including exhaust solenoid valve 64, chlorine reagent solenoid valve 66 and pH reagent solenoid valve 68.

The timing means 70 generates timing signals which regulate the operation of the control apparatus 30. Oscillator 72, an astable multivibrator of conventional design, having a pair of inverters 74 and 76 connected in series, supplies a square wave output having a period, preferably of 1.75 seconds. A variable resistor 78 connects to the junction of inverters 74 and 76 and also connects to the junction formed by resistor 81 and capacitor 82. Capacitor 82 further connects to the output of inverter 74, and resistor 80 further connects to the input of inverter 76. A detailed discussion relating to the theory of operation and design of multivibrators of this type may be had by reference to the publication, *RCA COS/MOS Integrated Circuit Manual*, Technical Series CMS-271, page 89.

The square wave output produced by oscillator 72 is fed to the input 84 of binary counter 86 which is a 14 bit counter capable of making a total of 16,384 binary counts. A count is made with every cycle of the square wave output oscillator oscillator 72 which, as hereinbefore mentioned, is preferably 1.75 seconds. The cycling on and off of automatic chlorine and pH control apparatus 30 is controlled by binary counter 86. Binary counter 86 cycles the control apparatus by activating enabling flip-flop 88, permitting transistor 90 to supply power to lamp 92 and permitting decade counter 94 to count up.

The 1.75 second period of oscillation of oscillator 72 results in binary counter 86 advancing through the total number of binary counts once every eight hours, supplying an output signal on output line 96 to enabling flip-flop 88. Enabling flip-flop 88 is a "D" type having its input tied to voltage regulator 62. When binary counter 86 supplies a signal to flip-flop 88, indicating that an eight hour period has elapsed, flip-flop 88 is clocked to a "set" condition, thereby releasing the reset input 95 on decade counter 94 and turning on lamp 92 through inverter 98, resistor 100 and transistor 90.

In the event that it is desired to perform an analysis at some time other than at the eight hour interval point, a push button switch 102 is provided. Push button switch 102 connects to flip-flop 88 and is operable to force flip-flop 88 to assume a set condition, causing the above described operation to result.

It is seen in the embodiment of FIG. 2 that oscillator 72 and binary country 86 form timing means 70 for periodically activating the automatic chlorine and pH control apparatus to perform chlorine residual and pH level analyses. It can be further seen that the timing means 70 is effective through enabling flip-flop 88 to perform this function. The period between samplings can be altered by changing the frequency of oscillation 72 or selecting a different output of binary counter 86.

Sequencing of control apparatus 30 functions is carried out by a controller 104. The basic element of the controller 104 is decade counter 94 which has ten output lines and advances one count with each clock pulse input. Each count represents a new state and is designated by the particular output line of that count going "high". Input clock pulses to decade counter 94 are received from binary counter 86. In the preferred embodiment shown in FIG. 2, a new clock pulse is supplied to decade counter 94 every twenty-eight seconds. Decade counter 94 also includes a "clock out" feature which supplies a signal via clock output line 106 to enabling flip-flop 88 to reset flip-flop 88, causing decade counter to be disabled and lamp 92 to be extinguished.

Quad input Nor gate 108 receives input signals from decoded outputs 0, 2, 5, and 7 of decade counter 94. The output of Nor gate 108 connects to Nor gate 110, which in turn connects to transistor 114 through resistor 112. A second quad input Nor gate 116 connects to decade counter 94 and receives input signals from decoded output 1, 4, 6, and 9. The output of quad input Nor gate 116 connects to an inverter 118, which in turn connects to driver circuit 120.

Referring further to FIG. 2, a one-shot 122 is connected to decade counter 94 and is triggered by an output signal appearing on decoded output 2. One-shot 122 includes capacitor 124 and resistor 126, which together form an RC network. One-shot 122 detects the presence of decade counter 94 in state 2 and produces a pulse of a duration determined by the RC time constant of capacitor 124 and resistor 126 at the output of one-shot 122. Another one-shot 128, which is identical to one-shot 122, connects to decoded output 7.

One-shot 128 includes a capcitor 130 and a resistor 132. One-shot 128 operates in the same manner as one-shot 122, producing a pulse of a defined duration at its output.

Further shown in the embodiment of FIG. 2 is a colorimetric analyzer 134 which performs the chlorine residual and pH test. The analyzer 134 includes a sample cell 136 which receives a metered amount of swimming pool water and reagent. The manner in which pool water and reagent are introduced into sample cell 136 will be discussed fully in connection with the embodiment of FIG. 3. Lamp 92 directs a light beam through sample cell 136 and onto photoelectric cells 138, 140, 142 and 144 which connect to the +8 volt busline 146. Each photocell connects to a resistor forming a separate voltage divider. As shown, photocells 138, 140, 142 and 144 connect to resistors 148, 150, 152 and 154 respectively. It will be apparent that as the color of the solution contained in sample cell 136 changes the amount of light permitted to pass through to the photocells will vary. As the light striking the photocells changes, the resistance values of the photocells change, altering the transfer ratios of the voltage dividers. Therefore, the voltage developed by each voltage divider is dependent upon the amount of light striking its respective photocell, which in turn depends upon the transparency of the solution contained within sample cell 136.

Connected to each photocell is a separate voltage comparator 156, 158, 160 or 162. Comparator 156 connects to the junction formed by photocell 138 and resistor 148 and receives on one input lead the voltage developed across resistor 148. A second input lead to comparator 156 connects to a variable resistor 164. In a similar manner, a first lead of comparator 158 connects to photocell 140 and resistor 152, and a second lead connects to a variable resistor 166. Comparator 160 connects to photocell 142 and resistor 152 with the second input lead for comparator 160 connecting to a variable resistor 168 and to a resistor 170 which is in series with a calibration potentiometer 172. Comparator 162 connects to photocell 144 and resistor 154 with a first input lead and connects to a variable resistor 174 and to a resistor 176, which is in series with another calibration potentiometer 178, with a second lead.

Each voltage comparator functions to detect the existence of a voltage supplied from its respective photocell and resistor combination, which either equals or exceeds the voltage value set by its respective variable resistor. Each comparator provides a two-state output signal, that is, a voltage of either ground potential or of supply voltage potential. Upon the voltage from a respective photocellresistor combination reaching the value set by the respective variable resistor, the output voltage present at the output terminal of the comparator switches to the opposite level.

Voltage comparator 162 serves to detect the existence or non-existence of a predetermined desired chlorine residual level. Calibration potentiometer 178 which connects to comparator 162 through resistor 176, as previously described, provides a reference voltage which corresponds to the the desired level of chlorine residual to be maintained in the pool water. Calibration potentiometer 172 provides a similar reference voltage which represents the desired pH level.

In the preferred embodiment shown, comparator 156 serves to detect the occurence of an error in the introduction of reagent into sample cell 136 with the output signal from comparator 156 being applied to one input of Nor gate 180. Comparator 158 also serves as an error detector, monitoring lamp 92 for the existence of a burned-out bulb, and its output signal is applied to the other input of Nor gate 180. Nor gate 180 provides a signal to flip-flop 182 when either comparator indicates an error. Comparator 160 detects the existence or non-existence of a desired pH level, supplying an output signal to a flip-flop 184. Comparator 162 detects the existence or non-existence of a desired level of chlorine residual, and its output signal is applied to a flip-flop 186.

Flip-flop 186 receives a clock signal from decade counter 94 when it moves into state 4, causing the information as to the existence or non-existence of the desired level of chlorine residual to be stored in flip-flop 186. The clock signal supplied to flip-flop 186 is denoted by the designation "F/F clock 1". Flip-flops 182 and 184 receive a common clock signal from decade counter 94, which clock signal is generated when decade counter 94 moves into state 8 and is denoted by the notation "F/F clock 2". When "F/F clock 2" occurs, the information present at the input lead of each flip-flop is entered therein and stored.

Connected to flip-flop 182 is an inverter 188 which serves to buffer the output signal from flip-flop 182. Resistor 190 connects to inverter 188 and to the base of transistor 192. A lamp 194 connects between the +17 volt buslines 58 and the collector of transistor 192 providing an alarm indicator that is turned on whenever transistor 192 is driven into conduction. Transistor 192 can be driven into conduction by the output of flip-flop 182 whenever an error condition is detected. Thus, there can be an alarm indication whenever there has been a failure of lamp 92, as detected by comparator 158, or no reagent has been entered into sample cell 136, as detected by comparator 156.

Flip-flops 184 and 186 have inverters 196 and 198 receiving the contents stored therein. A resistor 200 connects to inverter 196 and to a driver circuit 202. Similarly, resistor 204 and driver 206 connect to inverter 198. Driver circuits 202 and 204 are preferably Darlington amplifiers. Driver 202 controls solenoid 208 which regulates the flow of water to the acidifier 34. An indicator lamp 210 provides a visual indication that the acidifier 34 is in operation. In an identical manner, driver circuit 109 operates a solenoid valve 212 to control chlorinator 38 operation. An indicator lamp 214 is also provided to give an indication that the chlorinator 34 is enabled.

The combination of lamp 92, sample cell 136 and photocells 138, 140, 142, 144 form analyzer means 134 which periodically receives a liquid sample and is periodically enabled via enabling flip-flop 88 to perform an analysis on the sample. Comparators 156, 158, 160 and 162 form comparator means 155 for providing output signal indication of chlorine residual and pH level. Flip-flops 182, 184 and 186 form storage means 185 for retaining the output signal from the comparator means 155 over the period of time in which the analyzer means 134 is inactive. Drivers 202, 206 and solenoid valves 210, 214 form feed control means 205 for regulating acidifier and chlorinator operation.

As shown in FIG. 2 driver circuit 216 connects between one-shot 122 and chlorine reagent solenoid valve 66, and driver circuit 218 connects in a similar manner between one-shot 128 and pH reagent solenoid valve 68. When decade counter 94 moves into state 2, a pulse is supplied from one-shot 122 to driver circuit 216 which momentarily opens solenoid valve 66, permitting a metered amount of chlorine reagent to be entered into sample cell 136 along with a liquid sample from the swimming pool. Similarly, one-shot 128 produces an output pulse to driver 218 upon the entry of decade counter 94 into state 7, causing driver circuit 218 to momentarily open solenoid valve 68 permitting a predetermined amount of pH reagent to enter sample cell 136 along with a new liquid sample. Both driver circuit 216 and driver circuit 218 are preferably Darlington amplifiers.

As illustrated in FIG. 2, motor 220 is connected to the primary side of step-down transformer 50 at terminals 222 and 224. Between terminal 224 and motor 220 is a relay switch 226 which is closed upon the energization of relay coil 228 connected to the +17 busline 58 and a limit switch 230. Limit switch 230 detects the angular positioning of motor 220 and includes contacts 232 and 234. Energization of relay coil 228 can result from the operation of transistor 114 or driver circuit 120.

Figure 3:
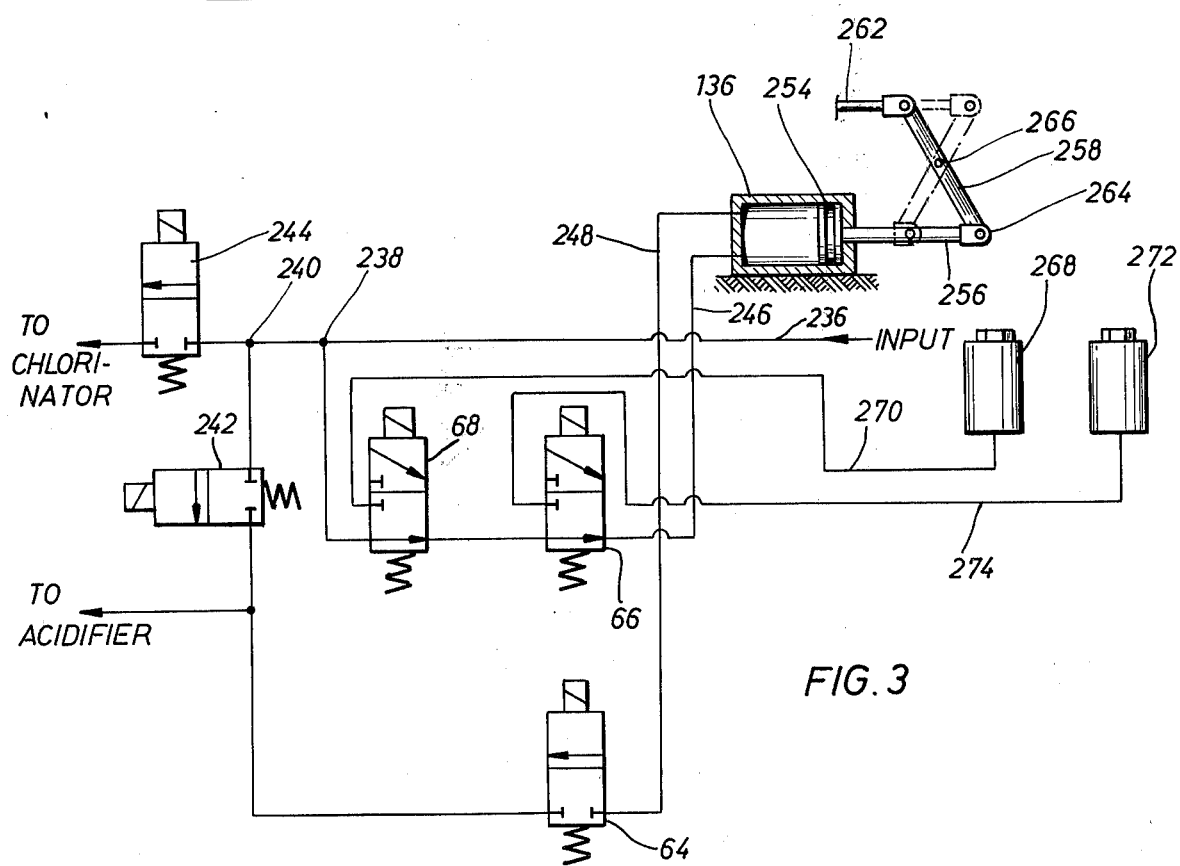
FIG. 3 is schematic representation of the fluid system internal to the automatic chlorine and pH control apparatus shown in FIG. 1.

Referring now to FIG. 3, a fluid system for handling the fluid flow within automatic chlorine and pH control apparatus 30 is schematically shown. Swimming pool water enters the apparatus at input conduit 236, as denoted by the arrow, and a first tap-off 238 directs the pool water to pH reagent solenoid valve 68. A second tap-off 240 connects acidifier control solenoid valve 242 to the supply of pool water entering inlet conduit 236. A chlorinator control solenoid valve 244 also connects to tap-off 240 and supplies swimming pool water to the chlorinator when opened.

Chlorine reagent solenoid valve 66 connects between pH reagent solenoid valve 68 and sample cell 136. When neither pH reagent solenoid valve 68 or chlorine reagent solenoid valve 66 is activated, sample cell input 246 is placed in fluid communication with tap-off 238 and input conduit 236. The exhaust outlet 248 of sample cell 136 connects to an exhaust solenoid valve 250 which directs exhaust fluid to acidifier fluid line 252.

In FIG. 3, sample cell 136 is shown as a mechanically actuated syringe having a piston 254 movable therein. A connecting rod 256 attaches to piston 254 and extends through one end of sample cell 136. Connecting rod 256 further attaches to a pivot arm 258 by a clevis with a push rod 262 connecting to the opposite end of pivot arm 258 by a clevis 264, causing pivot arm 258 to pivot about pin 266. Reciprocating movement of push rod 262 produces a similar reciprocating movement of piston 254. Withdrawal of connecting rod 256 from sample cell 136 causes a liquid sample from input conduit 236 to be introduced into the interior of sample cell 136 through sample cell input 246.

pH reagent solenoid valve 68 also communicates with pH reagent bottle 268 via conduit 270. During the withdrawal of connecting rod 256 from sample cell 136, pH reagent solenoid valve 68 can be momentarily actuated to place sample cell input 246 in fluid communication with pH reagent bottle 268. As a result, a metered amount of pH reagent is introduced into sample cell 136 along with the liquid sample from input conduit 236. Chlorine reagent solenoid valve 66 communicates with chlorine reagent bottle 272 via conduit 274 and can be momentarily actuated to introduce a metered amount of chlorine reagent into sample cell 136 along with a liquid sample from input conduit 246.

Expulsion from sample cell 136 of the liquid solution contained therein is through exhaust solenoid valve 64. When sample cell 136 is to be emptied, push rod 262 pivots pivot arm 158 causing connecting rod 256 to move into sample cell 136 advancing piston 254 and pushing the contained liquid out exhaust outlet 248. Simultaneously with the inward movement of connecting rod 256, exhaust solenoid valve 64 is opened, permitting the liquid solution in sample cell 136 to be exhausted through acidifier fluid line 252.

Acidifier control solenoid valve 242 and chlorine control solenoid valve 244 are independently controllable such that one or the other, or both may be opened. When chlorine control solenoid valve 244 is opened, the chlorinator is placed in fluid communication with input conduit 236, thereby causing the chlorinator to supply chlorine to the swimming pool. Similarly, when acidifier control solenoid valve 242 is opened, the acidifier is placed in fluid communication with input conduit 236 resulting in additional acid being added to the swimming pool water.

Figure 4:
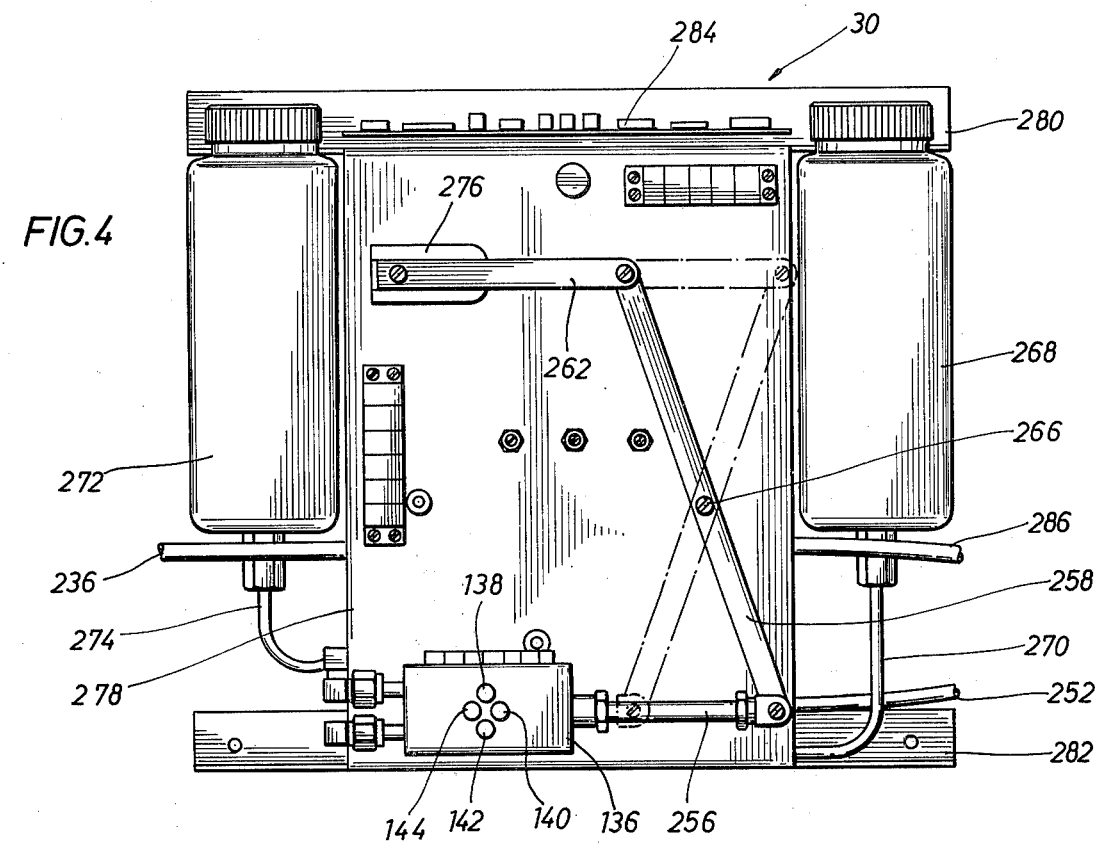
FIG. 4 is a front elevation view of the automatic chlorine and pH control apparatus of the present invention.
Figure 5:
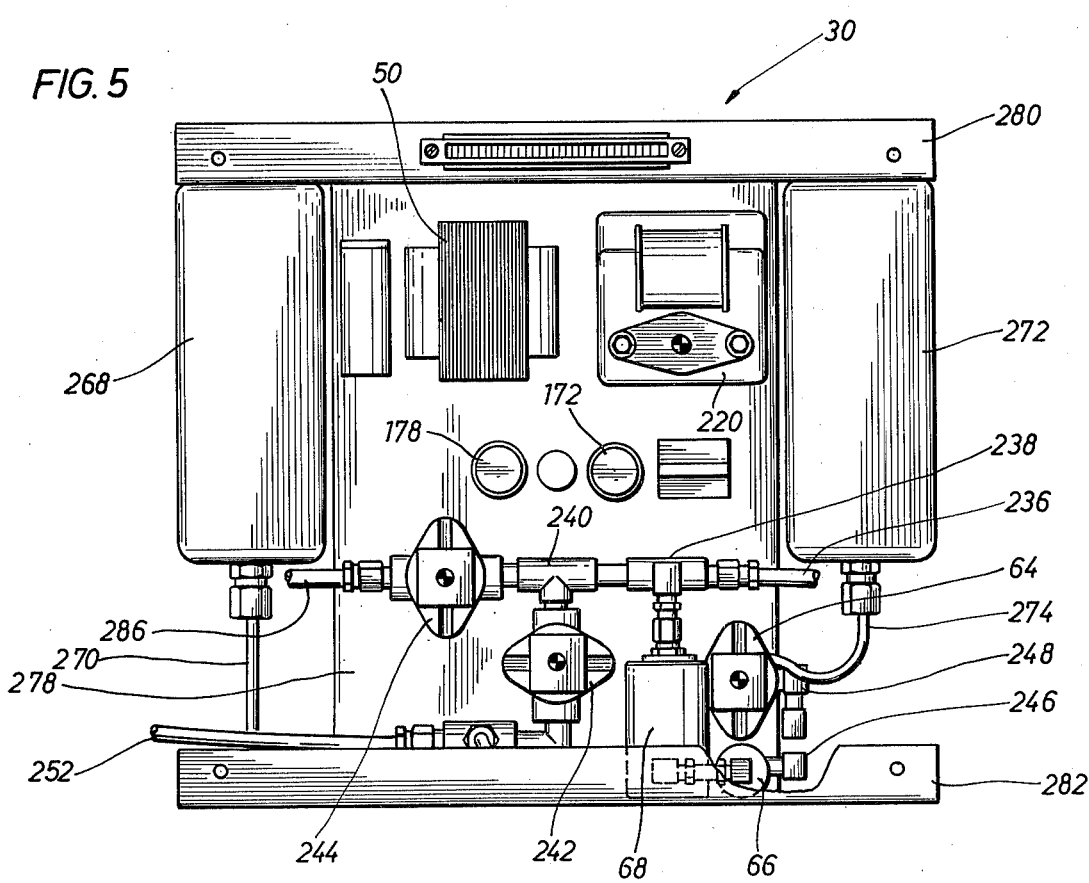
FIG. 5 is a rear elevation view of the fluid system of the automatic chlorine and pH control apparatus of the present invention.

Referring now to FIGS. 4 and 5, the automatic chlorine and pH control apparatus 30 is shown. Specifically, FIG. 4 shows a front elevation view of the apparatus, and FIG. 5 shows a rear elevation view of the apparatus.

First, with reference to FIG. 4, the sample cell 136 referred to in FIGS. 2 and 3 is shown in detail with the photocells 138, 140, 142, 144 mounted on the side thereof with exhaust outlet 248 and sample cell input 246, connecting to sample cell 136. The mechanical linkage comprising connecting rod 256, pivot arm 258 and push rod 262 connects to rotor 276 driven by a motor (not shown) such that when the rotor 276 rotates, push rod 262 reciprocates, producing linear movement of connecting rod 256.

Sample cell 136 and the mechanical linkage described mount to chassis 278 which includes upper and lower support members 280 and 282. Also mounting to chassis 278 is a printed circuit board 284 which carries the control system of the apparatus of the present invention. pH reagent bottle 268 is carried on one side of chassis 278, while chlorine reagent bottle 272 is carried on the other. Also shown in this view are connecting conduits 270 and 274, as well as input conduit 236, acidifier fluid line 252 and chlorine fluid line 286.

FIG. 5 illustrates in detail the fluid system described in FIG. 3. The fluid system mounts to chassis 278 as do motor 220, transformer 50 and calibration potentiometers 172, 178. In the illustration of the fluid system, the reference numerals refer to like components as in FIG. 3. In FIG. 5, tap-off 238 and tap-off 240 are shown as T-fittings, and input conduit 236, acidifier fluid line 252, chlorine fluid line 286 and the conduits 270, 274 are preferably flexible plastic lines.

In operation, after the automatic chlorine and pH control apparatus 30 of the present invention is connected into the circulation system of the swimming pool by inlet conduit 28 and outlet conduits 32, 36, the unit is provided with electrical power from a 110-volt outlet. Electrical power is immediately supplied to +17 volt busline 58 which causes the "power on" lamp 300 to light up and oscillator 72 to immediately begin supplying squarewave pulses to binary counter 86, causing the counter to begin advancing in count. Assuming that binary counter 86 was initially reset, a period of approximately eight hours will elapse before an output signal is supplied over output line 96 to clock enabling flip-flop 88, turning on lamp 92. Alternatively, if it is desired to make an immediate test of chlorine and pH, push button switch 102 may be closed, overriding binary counter 86 and setting enabling flip-flop 88.

With flip-flop 88 in the set condition, decade counter 94 counts the pulses supplied from binary counter 86, which pulses arrive every twenty-eight seconds. Initially, assuming that decade counter 94 is in a reset condition, the 0 state of decade counter 94 will present a signal through Nor gate 108 and Nor gate 110 which will turn on transistor 114. Current is drawn from +17 volt busline 58 through relay coil 228 and contact 232 of limit switch 230 resulting in relay coil 228 becoming energized and relay switch 226 closing, supplying power to motor 220. Energization of motor 220 causes rotor 276 to turn, pulling push rod 262 and causing pivot arm 258 to pivot counterclockwise. This counterclockwise movement of pivot arm 258 causes connecting rod 256 to be urged from within sample cell 136. This movement, of course, causes piston 254 to move within sample cell 136 causing a liquid sample to be drawn into the cell. Motor 220 remains energized until contact is made with limit switch 230, signifying that piston 254 has been fully moved within sample cell 136, opening contact 232, thereby de-energizing relay coil 228. The second contact 234 of limit switch 230 then closes.

Decade counter 94 receives another pulse from binary counter 86 at the end of the next twenty-eight second interval that causes decade counter 94 to move into state 1. Upon this change of state, transistor 114 is turned off and driver circuit 120 is activated. Driver circuit 120, as previously described, opens exhaust solenoid valve 64, and at the same instant, motor 220 is again energized producing further rotation of rotor 276. Further rotation of rotor 276, of course, causes pivot arm 258 to rotate clockwise urging piston 254 back through sample cell 136 with like motion continuing until limit switch 230 is contacted, at which time the motor 220 is de-energized. Exhaust solenoid valve 64 remains open until decade counter 94 moves into the next state.

The discussion just given with regard to the operation of the system during states 0 and 1 of decade counter 94 describes a "washing out" function. This preliminary washing out of the sample cell removes contaminants which might alter the results of the analysis to be performed later.

Upon the receipt of the next clock pulse from binary counter 86, decade counter 94 moves into state 2, at which time transistor 114 is again turned on causing motor 220 to become energized. Motor 220 acts upon rotor 276 to cause piston 254 to be drawn through sample cell 136 in the manner previously described with piston 254 drawing another liquid sample into sample cell 136. One-shot 122 supplies a pulse of predetermined duration to driver circuit 216 opening chlorine reagent solenoid valve 66 to permit a metered amount of chlorine reagent to enter sample cell 136 along with the liquid sample.

The chlorine reagent to be used in the apparatus of the present invention can be any chemical reagent which is sensitive to chlorine concentration and which can show a color change proportional to the concentration of chlorine in a liquid sample. Since chlorine is an active bleaching agent, an effective chlorine reagent is one which is colored, with the color being bleached out by the chlorine in the liquid sample. The degree of bleaching and, as a result, the color and transparency of the liquid sample as compared to a predetermined reference can then be utilized as a measure of the chlorine content of the liquid sample. Typical chlorine reagents found particularly effective for use in the apparatus of the present invention include methyl orange and phenophthalein. The apparatus of the present invention is preferably calibrated to detect at color change a chlorine residual of 1 ppm. The above materials turn completely clear with a chlorine residual of 3 ppm.

Decade counter 94 advances to state 3 with the next pulse. Upon the occurence of passage into this state, transistor 144 is turned off, and the system assumes a quiescent condition to provide an additional twenty-eight second interval in which the chlorine reagent can mix with the liquid sample and fully react.

As the mixture within sample cell 136 reacts, the color of the solution changes due to chlorine bleaching of the chlorine reagent. Depending upon the amount of chlorine residual present in the liquid sample, the solution will have a certain degree of transparency which will of course, affect the amount of light striking photocell 144. At the conclusion of the reaction and upon the solution reaching a stable condition, photocell 144 in combination with resistor 154 outputs a constant voltage to comparator 162. Comparator 162 compares the voltage from photocell 144 and resistor 154 with a reference voltage determined by calibration potentiometer 178 along with variable resistor 174 to detect the existence of a voltage from the analyzer 134 which exceeds the reference voltage and to produce a voltage at its output indicative thereof. The comparator 162 produces a two level output voltage that is compatible with the digital flip-flop 186. The detection result, in the form of a "high" or "low" logic output, from comparator 162 is presented to flip-flop 186. When decade counter 94 receives the next pulse from binary counter 86, sending decade counter 94 into state 4, a clock signal will be supplied to flip-flop 186, causing the detection result to be stored therein.

At the same time flip-flop 186 is being supplied with the clock signal, that same signal is also being supplied to Nor gate 116 which activates driver circuit 120, opening exhaust solenoid valve 64 and at the same time energizing motor 220. Piston 254 is again caused to move back through sample cell 136 exhausting the reacted solution contained therein. From the schematic diagram in FIG. 3, it will be observed that the contents of sample cell 136 are exhausted through acidifier fluid line 252 and are fed into the swimming pool. The chlorine reagents referred to above are not detrimental to humans, and are fed into the pool only in minute quantities. However, if it is not desired to permit the reacted solution to be fed back into the pool, the discharge of the exhaust solenoid valve 64 could be directed to a separate reservoir container.

The next two pulses from binary counter 86 send decade counter 94 into state 5 and then state 6 with the operation of these two states being the same as that which occurs during states 0 and 1. That operation is, of course, the "washing out" of sample cell 136 to rid it of any contaminants which might affect the analysis to be next performed for pH level.

As decade counter 94 moves into state 7, motor 220 is again energized causing piston 254 to be urged through sample cell 136 drawing a liquid sample thereinto. At the same time that the liquid sample is being drawn into the sample cell, one-shot 128 activates driver circuit 218 causing pH reagent solenoid valve 68 to open permitting a metered amount of pH reagent to enter sample cell 136 along with the liquid sample.

The pH reagent can be any chemical reagent which is sensitive to pH within the predetermined range selected for the swimming pool. This chemical reagent can be one which demonstrates a color range of characteristic color within this pH range, but not above. By observing this color change or characteristic color through the apparatus of the present invention, it is then possible to obtain a result which dictates the addition or non-addition of acid to the swimming pool. A very suitable pH reagent has been found to be cresol red. This material goes through a gradual color change of yellow-red-purple through the pH range desirably maintained in the swimming pool water. For example, the reagent is colorless at pH 6.8, pink at pH 8.3 and purple at pH 9.4. Triggering of the apparatus can therefore be easily calibrated to this color change.

After the pH reagent and liquid sample mix and react, resulting in a change of color of the liquid sample, a voltage is supplied to a comparator 160 from photocell 142 that is functionally related to the color the liquid sample and hence the pH thereof. Comparator 162 detects the existence of a desired pH by comparing the voltage with a reference voltage from resistors 168 and 170, and produces an output signal indicative thereof, which signal is a twolevel signal compatible with digital flip-flop 184.

When decade counter 94 moves into state 8 at the occurrence of the next pulse from binary counter 86, a clock signal is supplied to flip-flop 184 causing it to store the detection result therein. This clock signal, denoted F/F clock 2, is also supplied to flip-flop 182 which stores the alarm detection results available from comparators 156 and 158.

The next pulse from binary counter 86 sends decade counter 94 into state 9 resulting in a signal being supplied to Nor gate 116, which again activates driver circuit 120 to open exhaust solenoid valve 64, permitting the reacted solution present in sample cell 136 to be exhausted leaving the cell empty. Also, as mentioned above with regard to the chlorine reagents, the pH reagent can be discharged back into the pool without danger, or if so desired, a separate reservoir can receive the reacted solution from sample cell 136. Also, a pulse is produced by decade counter 94 and is supplied to flip-flop 88 via output line 106 forcing enabling flip-flop 88 to become reset inhibiting decade counter 94 and extinguishing lamp 92.

Flip-flops 182, 184 and 186 energized, however, and the information stored therein is continuously suppled to circuitry external to them. Specifically, flip-flop 186 supplies a continuous signal to driver circuit 206 causing chlorine control solenoid valve 212 to be maintained in an open or closed position over the following eight hour interval before analyzer operation is again permitted. Similarly, flip-flop 184 supplies a signal to driver circuit 202 causing acidifier control solenoid valve 208 to maintain the acidifier in an opened or closed position until the next analysis. Finally, flip-flop 182 supplies a signal to produce an alarm indication via lamp 194.

The foregoing description has been a discussion of one entire cycle of the operation of automatic chlorine and pH control apparatus 30. At the conclusion of a cycle of operation, oscillator 72 and binary counter 86 continue to operate. When binary counter 86 again times out an eight hour period, a new analysis will be performed for both pH and chlorine residual. At that time, the condition set in flip-flops 184 and 186 can be changed to reflect an updated condition.

Components for the preferred embodiments of the chlorine and pH control apparatus include:

| POWER SUPPLY | | |
|---|---|---|
| Transformer 50 | | Stancor RT-202 |
| Diodes 53, 54, 55, 56 | | 1N 916 |
| Capacitor 60 | | 1000 microfarads |
| Voltage Reguraror 62 | | Fairchild 7808UC |
| TIMER | | |
| Variable resistor | 78 | 5-6 megaohms |
| Resistor | 80 | 15 megaohms |
| Capacitor | 82 | 0.1 microfarad |
| Inverters | 74, 76 | Motorola MC14049CP |
| Binary Counter | 86 | Motorola MC14020CP |
| CONTROLLER | | |
| Decade Counter | 94 | Motorola MC14017CP |
| Nor gate | 108, 116 | Motorola MC1402CP |
| Nor gate | 110 | Motorola MC1401CP |
| Inverter | 118 | Motorola MC14049CP |
| One Shot | 122, 128 | National MM 74 G 221 N |
| Capacitor | 124, 130 | ITT 4.7 mf |
| Resistor | 126, 132 | Comprehensive 82 k ohms |
| ANALYZER | | |
| Photocell | 138, 140, 142, 144 | Quantrol Z 240A |
| Resistors | 148, 150, 152, 154 | 1000 Ohms |
| Inverter | 98 | Motorola MC14049CP |
| Resistor | 100 | 10,000 Ohm |
| Transistor | 90 | Texas Instruments A572222 |
| COMPARATOR | | |
| Comparator | 165, 158, 160, 162 | National Semiconductor LM 339 |
| Potentiometers | 164, 166, 168, 172, 174, 178 | 2000 Ohms |
| Resistors | 170, 176 | 2700 Ohms |
| Nor gate | 180 | Motorola MC14001CP |
| STORAGE | | |
| Flip-flop | 182, 184, 186 | Motorola MC14013CP |
| FEED CONTROL | | |
| Inverters | 196, 198 | Motorola MC14040CP |
| Resistors | 200, 204 | 10,000 Ohms |
| Driver | 202, 206 | Darlington Amplifier |
| Solenoid | 208 | Asco US82617 |
| Solenoid | 212 | Asco USX8210A20 |
| MISCELLANEOUS | | |
| Transistor | 192, 114 | Texas Instruments A572222 |
| Resistor | 190 | 10,000 Ohms |
| Inverter | 188 | Motorola MC14049CP |
| Flip-flop | 88 | Motorola MC14013CP |
| Driver | 120, 216, 218 | Darlington amplifiers |
| Resistor | 112 | 10,000 Ohm |
| Motor | 220 | Dayton 3M287 |
| Limit Switch | 230 | Micro-Switch 311SM3 |
| Relay | 228 | Potter & Brunsfield KA5DY |
| Solenoid | 64, 66, 68 | 64-Asco US 8262C13 66-68 Skinner C4R180 |

While the present invention has been described primarily with regard to the foregoing preferred embodiments, it should be apparent that the present invention can be subject to various modifications within the scope of the present invention. Accordingly, the present invention cannot be limited to the embodiments above, but must be construed as broadly as any and all equivalents thereof.

What is claimed is:

1. An apparatus for automatically controlling a chlorinator supplying chlorine to water in a swimming pool, which comprises:

analyzer means having a sample cell for holding a liquid sample from a swimming pool and for producing an electrical signal functionally related to the chlorine residual in said liquid sample;

timing means including a counter operably connected to said analyzer means for generating a first set of timing signals to enable the operation of said analyzer means on a preselected periodic interval and a second set of timing signals; reagent control means for metering the introduction of chlorine reagent into the sample cell;

controller means for defining a cycle of operation and including a multistate counter receiving said second set of timing signals from said timing means, said controller means being operably connected to a motor driven plunger for drawing in and expelling liquid from the sample cell and said reagent control means to:
 a. draw into and expel from the sample cell a quantity of liquid to wash out the cell during one phase of the cycle of operation,
 b. draw a liquid sample and inject chlorine reagent into the sample cell during the following phase of the cycle of operation, and
 c. exhaust the contents of the sample cell after a chlorine residual test has been completed;

comparator means coupled to said analyzer means for detecting the existence or non-existence of a desired level of chlorine residual in the liquid sample and for providing an output signal indicative thereof; and feed control means responsive to the output signal from said comparator means for regulating a chlorinator supplying chlorine to the swimming pool water.

2. The apparatus of claim 1, wherein said analyzer means includes:
a light source disposed proximate said sample cell to project light thereon from one side; and
photocell means disposed on the side of said sample cell opposite said light source to receive the light passing through said sample cell and the contained liquid sample.

3. The apparatus of claim 1, further including calibration means for presetting said comparator means to detect the existence or non-existence of a proper level of chlorine residual to be maintained in the water of the swimming pool.

4. The apparatus of claim 1, wherein said feed control means comprises a solenoid valve connected into a flow line supplying water to the chlorinator.

5. The apparatus of claim 1, further comprising:
storage means for retaining the output signal from said comparator means over the interval of time between periodic introduction of liquid samples into said analyzer means to maintain the setting of said feed control means.

6. The apparatus of claim 1 wherein the counter in said controller means is a decade counter.

7. An apparatus for regulating the introduction of a water purification substance and a pH compensation substance into a reservoir of water to maintain a desired residual amount of purification substance and a desired pH level therein, comprising:
analyzer means including a sample cell for producing a first electrical signal functionally related to the amount of liquid purification substance present in a first liquid sample from the reservoir and for producing a second electrical signal functionally related to the pH of a second liquid sample from the reservoir;
timing means including a counter operably connected to said analyzer means for generating a first set of timing signals to enable the operation of said analyzer means on a preselected periodic interval and a second set of timing signals;
a motor driven plunger for drawing in and expelling liquid from the sample cell in said analyzer means;
reagent introduction means for entering first and second reagents into said analyzer along with respective first and second liquid samples;
controller means for defining a cycle of operation and including a counter receiving said second set of timing signals from said timing means, said controller means being operably connected to said motor driven plunger and said reagent introduction means to:
 a. activate said plunger to cause a quantity of liquid to be drawn into and expelled from said analyzer means to wash out the cell during a first phase of the cycle of operation,
 b. activate said plunger to draw a first liquid sample into said analyzer means and activate said reagent introduction means to release a first reagent into said analyzer means during a second phase of the cycle of operation,
 c. exhaust the liquid contents of the analyzer means after a test has been completed, and
 d. repeat the sequence in connection with the testing of the second liquid sample with the second reagent; and
means responsive to each of said first and second electrical signals from said analyzer means for enabling the introduction of an additional amount of liquid purification substance and the introduction of an additional amount of pH compensation substance into the reservoir.

8. The apparatus of claim 7, wherein said means for enabling the introduction of addition purification substance and pH compensating substance includes:
a comparator coupled to said analyzer means for determining the existence of a desired residual amount of the purification substance and a desired pH level, and for producing signals indicative thereof.

9. The apparatus of claim 8, further comprising:
feed control means operably connected to said comparator and responsive to the signals produced thereby for regulating the introduction of additional water purification substance and pH compensating substance into the reservoir of water.

10. The apparatus of claim 9, further comprising:
a storage element coupled between said comparator and said feed control means to store the signals from said comparator and continuously present them to said feed control means over the interval of time between the taking of liquid samples.

11. The apparatus of claim 7 wherein said reagent introduction means comprises first and second reagent bottles coupled via a conduit to respective solenoid valves that are in fluid communication with said analyzer means.

12. An apparatus for automatically controlling the introduction of chlorine into a swimming pool by a chlorinator and controlling the introduction of an acid substance into the pool water to maintain a desired residual amount of purification substance and a desired pH level therein, comprising:
a colorimetric analyzer having a light source and first and second photocells connected to said supply of electrical power and including a sample cell disposed between the light source and photocells into which first and second liquid samples from a swimming pool are introduced;

said analyzer producing a first electrical signal proportional to the chlorine residual present in said first liquid sample and a second electrical signal functionally related to the pH level of the second liquid sample;

timing means including an oscillator circuit driving a counter to provide first and second clock signals having different periods of repetition with said second clock signal being used to enable the operation of said analyzer means on a preselected periodic interval;

a motor driven plunger for drawing in and expelling liquid from the sample cell, said motor being activated by a solenoid;

a bottle of chlorine reagent in fluid communication with the sample cell via a duct with a solenoid valve metering reagent flow;

a bottle of pH reagent in fluid communication with the sample cell via a duct with a solenoid valve metering reagent flow;

a controller connected to the solenoid activating said motor driven plunger and to the solenoid valves of said bottle of chlorine reagent and said bottle of pH reagent, said controller comprising a counter receiving the first of said clock signals from said timing means for defining a cycle of operation that involves:

a. drawing in and expelling liquid from the sample cell to wash it out prior to the making of a first liquid sample analysis, b. simultaneously drawing in a first liquid sample for analysis along with chlorine reagent and expelling the contents of the sample cell at the conclusion of a chlorine residual analysis, c. drawing in and expelling liquid from the sample cell to wash it out prior to the making of a second liquid sample analysis, and d. simultaneously drawing in a second liquid sample for analysis along with the pH reagent and exhausting the contents of the sample cell at the conclusion of the analysis;

first and second comparators coupled to the first and second photocells of said analyzer for detecting the presence of a desired amount of chlorine residual in the first liquid sample and a desired pH level of the second liquid sample;

said first comparator producing an electrical signal indicative of the existence or non-existence of a desired chlorine residual by comparing the electrical signal from the first photocell with a first reference signal and said second comparator producing an electrical signal indicative of the existence of non-existence of a desired pH level by comparing the electrical signal from the second photocell with a second reference signal;

first and second storage elements receiving the signals from said first and second comparator, respectively, and retaining the values thereof over the period of time between the periodic operation of said analyzer means initiated by said timing means;

a chlorinator feed control responsive to the signal value stored in said first storage element for enabling the operation of a chlorinator supplying chlorine to the swimming pool water; and an acidifier feed control responsive to the signal value stored in said second storage element for enabling the operation of an acidifier supplying an acid substance to the swimming pool water.

* * * * *

UNITED STATES PATENT OFFICE
CERTIFICATE OF CORRECTION

Patent No. 4016079            Dated Apr. 5, 1977

Inventor(s) Ernest O. Severin, Houston, Tex.

It is certified that error appears in the above-identified patent and that said Letters Patent are hereby corrected as shown below:

Column 10, line 4, delete "158" and insert therefor -- 258 --.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*